United States Patent
Liddell et al.

(10) Patent No.: US 8,870,064 B2
(45) Date of Patent: Oct. 28, 2014

(54) SELF-SERVICE TERMINAL MANAGEMENT

(75) Inventors: Marc Liddell, Gateshead (GB); Heather McCracken, Fife (GB); Simon J. Forrest, Dundee (GB)

(73) Assignee: NCR Corporation, Duluth, GA (US)

( * ) Notice: Subject to any disclaimer, the term of this patent is extended or adjusted under 35 U.S.C. 154(b) by 1124 days.

(21) Appl. No.: 12/551,053

(22) Filed: Aug. 31, 2009

(65) Prior Publication Data

US 2011/0054677 A1  Mar. 3, 2011

(51) Int. Cl.
*G06Q 40/00* (2012.01)
*G06Q 40/02* (2012.01)
*G06Q 20/20* (2012.01)
*G06Q 10/06* (2012.01)
*G07F 19/00* (2006.01)

(52) U.S. Cl.
CPC .............. *G07F 19/206* (2013.01); *G06Q 40/02* (2013.01); *G06Q 20/202* (2013.01); *G06Q 10/06* (2013.01); *G07F 19/20* (2013.01); *G07F 19/207* (2013.01); *G06Q 20/204* (2013.01)
USPC ........................................................ 235/379

(58) Field of Classification Search
CPC ....... H04L 67/02; H04L 69/329; H04L 67/28; H04L 67/04; H04L 67/16; H04L 67/36; H04L 29/06; H04L 67/12; G06Q 40/00; G06Q 30/06; G06Q 20/1085; G06Q 20/18; G07F 19/211; G07F 19/20
USPC ........................................................ 235/379
See application file for complete search history.

(56) References Cited

U.S. PATENT DOCUMENTS

| | | | | |
|---|---|---|---|---|
| 4,107,777 | A * | 8/1978 | Pearson et al. | 705/413 |
| 6,676,016 | B1 * | 1/2004 | Coskrey, IV | 235/380 |
| 6,968,321 | B1 * | 11/2005 | Yu | 705/43 |
| 7,852,873 | B2 * | 12/2010 | Bird | 370/463 |
| 2002/0032655 | A1 * | 3/2002 | Antonin et al. | 705/43 |
| 2003/0038835 | A1 * | 2/2003 | DeFelice | 345/738 |
| 2003/0071115 | A1 * | 4/2003 | Horn et al. | 235/379 |
| 2003/0126084 | A1 * | 7/2003 | Drummond et al. | 705/43 |
| 2005/0063005 | A1 * | 3/2005 | Phillips et al. | 358/1.15 |
| 2006/0059287 | A1 * | 3/2006 | Rivard et al. | 710/300 |
| 2007/0030513 | A1 * | 2/2007 | Kitahara et al. | 358/1.15 |
| 2009/0100178 | A1 * | 4/2009 | Gonzales et al. | 709/226 |
| 2009/0159661 | A1 * | 6/2009 | Sanches | 235/379 |

* cited by examiner

*Primary Examiner* — Thien M Le
*Assistant Examiner* — Tae Kim
(74) *Attorney, Agent, or Firm* — Joseph P. Mehrle

(57) ABSTRACT

A self-service terminal comprises at least one customer transaction module, a terminal controller, a management component, and a network connection coupled to the terminal controller. The customer transaction module is operable to (i) implement a function associated with a customer transaction, and (ii) provide status information relating to the module. The terminal controller is coupled to the customer transaction module and includes (i) a management component for retrieving status information from the customer transaction module and (ii) a Web services interface for providing access to the retrieved status information to a remote device. The network connection is coupled to the controller and provides the remote device with access to the Web services interface.

10 Claims, 3 Drawing Sheets

SELF-SERVICE TERMINAL MANAGEMENT

FIELD OF INVENTION

The present invention relates to self-service terminal management.

BACKGROUND OF INVENTION

A common type of self-service terminal is an automated teller machine (ATM). An ATM is a networked computing device that includes a plurality of interconnected modules for performing functions relating to customer transactions and machine maintenance. Many of these modules include a processor programmed to perform functions associated with that module, and to track state of health information about that module.

A central processing core typically executes a platform and an application. The platform (which includes an operating system) manages the modules in the ATM, and translates industry-standard commands (for example, in CEN/XFS format) from the application to specific commands for each module. The application conveys appropriate industry-standard commands to the platform to provide customer transactions, and also to provide management facilities for service personnel (such as printer paper replenishers, banknote replenishers or technicians).

A remote management system typically manages a network of ATMs, each ATM providing status information to the management system asynchronously (in the event of a failure being detected) or in response to a request for information from the remote management system.

The remote management system typically dispatches service personnel in the event of a failure being detected at an ATM, and provides the service personnel with an indication of the type of failure that was detected. However, this information may be out-of-date by the time it is received by the service personnel, and it may also not contain the full information provided by the ATM because the data received by the remote management system is typically transformed into a new format for conveying to the service personnel.

It would be advantageous if the service personnel could obtain up-to-date information about errors in an ATM, and also at least as much information as the ATM provided to the remote management system. This would avoid service personnel making an unnecessary site visit to an ATM that rectified itself subsequent to sending a fault message to the remote management system. By being able to check the more detailed ATM status information, a service person would be able to obtain any required part to fix a problem with an ATM prior to a site visit.

SUMMARY OF INVENTION

Accordingly, the invention generally provides methods, systems, apparatus, and software for managing networked devices.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a self-service terminal comprising: a customer transaction module operable to (i) implement a function associated with a customer transaction, and (ii) provide status information relating to the module; a terminal controller coupled to the customer transaction module and including (i) a management component for retrieving status information from the customer transaction module and (ii) a Web services interface for providing access to the retrieved status information to a remote device; and a network connection coupled to the controller to provide a remote device with access to the Web services interface.

As used herein, a "Web service" means a software system designed to support interoperable machine-to-machine interaction over a network. A Web service has an interface described in a machine-processable format, specifically a Web Services Description Language (WSDL). Other systems interact with the Web service in a manner prescribed, for example, using SOAP (Simple Object Access to Protocol) messages, typically conveyed using HTTP (Hyper Text Transfer Protocol) with an XML (eXtensible Mark-up Language) serialization in conjunction with other Web-related standards. The source of this definition is http://www.w3.org/TR/ws-gloss/.

The remote device may be a portable computer (such as a personal digital assistant (PDA) or a cellular radiofrequency telephone (cellphone)) carried by service personnel. Provided the remote device has Web access (and the device and/or user has any necessary security clearance or authorization), it can be used to obtain status information directly from the Web services interface without having to go through the remote management system.

The self-service terminal may comprise a plurality of customer transaction modules. Customer transaction modules may include: a card reader (motorized, dip, or swipe), a media dispenser (cash, voucher, ticket, or the like), a media depository (checks, banknotes, coins, slips, tickets, vouchers, or the like), a printer (receipt, statement, or the like), a PIN entry device (encrypting keypad, encrypting touch-sensitive panel, or the like), or the like.

The self-service terminal may comprise a plurality of service personnel modules, such as a journal printer, a service operator panel, or the like.

The terminal controller may execute a platform, including an operating system, for controlling the customer transaction modules and any service personnel modules.

The self-service terminal may be an automated teller machine (ATM), an information kiosk, a financial services center, a bill payment kiosk, a lottery kiosk, a postal services machine, a check-in and/or check-out terminal such as those used in the retail, hotel, car rental, gaming, healthcare, and airline industries.

According to a second aspect there is provided a self-service terminal comprising: a media dispense module operable to implement a media dispense function, and including (i) a processor executing (a) a management component operable to obtain status information relating to the media dispense module, and (b) a Web services interface for providing access to the obtained status information to a remote device, and (ii) a network connection for communicating directly with a remote transaction controller; and a media deposit module operable to implement a media deposit function, and including (i) a processor executing (a) a management component operable to obtain status information relating to the media deposit module, and (b) a Web services interface for providing access to the obtained status information to a remote device, and (ii) a network connection for communicating directly with a remote transaction controller.

The network connections may comprise dedicated network cards for each module. Alternatively, the network connections may be provided by dedicated communication stacks, each communication stack being associated with a serial port, such as a USB port, to provide the transport layer; and a single network card used by the serial ports.

Using dedicated network cards, or the like, allows a self-service terminal to operate as an ultra thin client, with each module communicating with the remote transaction controller directly, instead of with a controller within the self-service terminal.

Using a serial bus, such as USB, allows a single network card to be used, but this means that the modules all rely on the single network card for external communication, so any hardware fault with this single network card will leave the modules without any communication link.

Additional modules may be provided in the self-service terminal

According to a third aspect there is provided a distributed self-service terminal comprising customer transaction modules at a first location and a transaction controller at a second location, remote from the first location, the customer transaction modules including: a media dispense module operable to implement a media dispense function, and including (i) a processor executing (a) a management component operable to obtain status information relating to the media dispense module, and (b) a Web services interface for providing access to the obtained status information to a remote device, and (ii) a network connection for communicating directly with the remote transaction controller; and a media deposit module operable to implement a media deposit function, and including (i) a processor executing (a) a management component operable to obtain status information relating to the media deposit module, and (b) a Web services interface for providing access to the obtained status information to a remote device, and (ii) a network connection for communicating directly with the remote transaction controller.

Additional modules may be provided in the self-service terminal.

The remote transaction controller may control a plurality of media dispense modules, each media dispense module being located in a different geographical location. For example, each media dispense module may be more than one kilometer from the other media dispense modules.

The remote transaction controller may control a plurality of media deposit modules, each media deposit module being located in a different geographical location. For example, each media deposit module may be more than one kilometer from the other media deposit modules.

Some distributed self-service terminals may only include media dispense modules. Other distributed self-service terminals may only include media deposit modules.

This aspect of the invention enables a single controller to control a plurality of different customer fulfillment stations, each customer fulfillment station being geographically remote from the other customer fulfillment stations.

According to a fourth aspect there is provided a method of providing access to management information relating to a self-service terminal, the method comprising: receiving a request for management information from a remote device via a Web Service executing on a controller within the self-service terminal; translating the request to a format compatible with a management component executing on the self-service terminal; retrieving the requested management information from a module within the self-service terminal via the management component; and providing the requested management information to the remote device.

The method may include the further step of requiring a request for information via the Web Service to fulfill a security criterion.

The security criterion may include the request for information: (i) originating from a known source (for example, a registered IP address), and/or (ii) including a correct username and passcode combination, and/or (iii) originating from a person registered to receive the type of information requested.

According to a fifth aspect there is provided a method of providing access to management information stored in a self-service terminal, the method comprising: receiving from a remote device a request for management information in a format compatible with a Web services interface; ascertaining if the received request fulfils a security criterion; transforming the received request into a different format in the event that the request does fulfill the security criterion; communicating the transformed request to a device manager; receiving a response from the device manager; transforming the response into a format compatible with a Web services interface; and relaying the transformed response to the remote device.

The different format may be a CEN XFS format, an OPOS format, a CUSS format, a proprietary format, or any other convenient format.

These aspects of the invention have the advantage of allowing service personnel to query a self-service terminal directly, for example via a Web browser on a portable device, to obtain status information that is up-to-date and without loss of information as a result of having to change the format of the status information. By using Web services, it is possible to view the same information on remote devices (computers, cellular telephones, and the like) having different operating systems without having to write a dedicated client application for each device.

These and other aspects will be apparent from the following specific description, given by way of example, with reference to the accompanying drawings.

DETAILED DESCRIPTION

Figure 1:
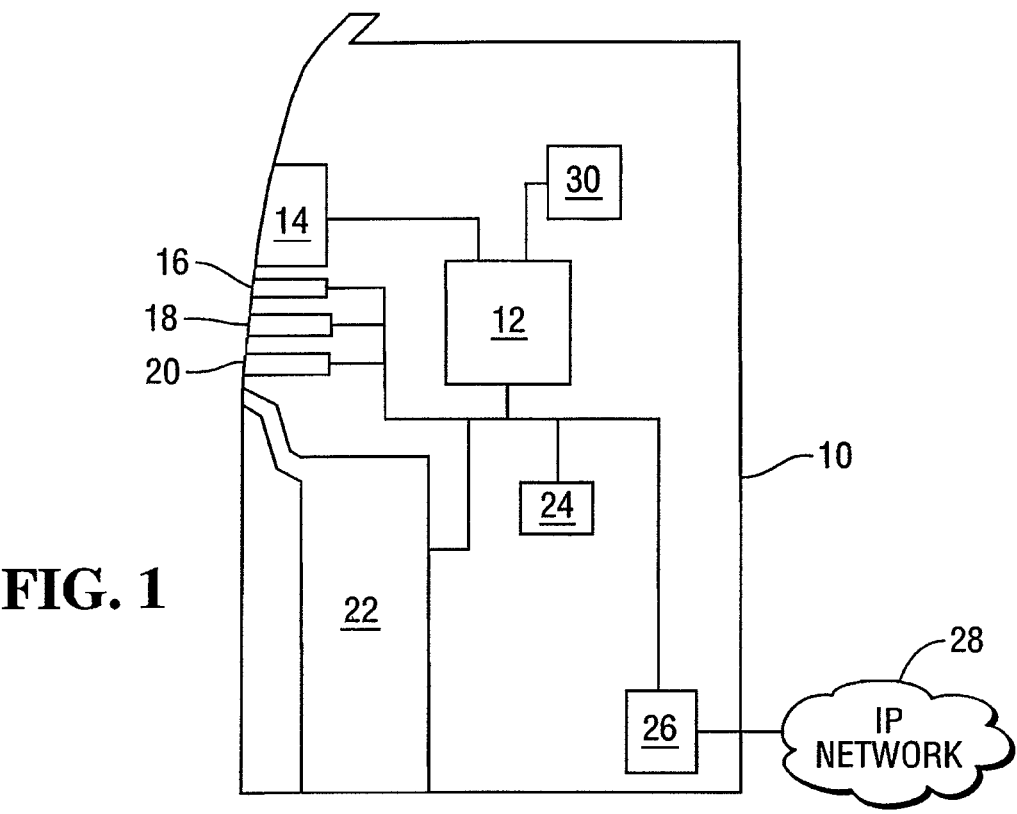
FIG. 1 is a block diagram of a self-service terminal including a Web services interface according to one embodiment of the present invention.

Reference is first made to FIG. 1, which is a simplified block diagram of a self-service terminal 10 (in the form of an ATM) according to one embodiment of the present invention.

The ATM 10 comprises a plurality of modules for enabling transactions to be executed and recorded by the ATM 10. These ATM modules include customer transaction modules and service personnel modules. The ATM modules comprise: an ATM controller 12, a customer display 14, a card reader/writer module 16, an encrypting keypad module 18, a receipt printer module 20, a cash dispenser module 22, a journal printer module 24 for creating a record of every transaction executed by the ATM 10, a network connection module 26 for accessing a remote authorization system (not shown) via an IP network 28, and an operator panel module 30 for use by a service operator (such as a field engineer, a replenisher (of currency, of printer paper, or the like), or the like).

Some of the customer transaction modules (such as the ATM controller 12) are also used by the service personnel for implementing management functions. However, some of the modules are referred to herein as service personnel modules (such as the journal printer module 24 and the operator panel module 30) because they are never used by ATM customers.

Figure 2:
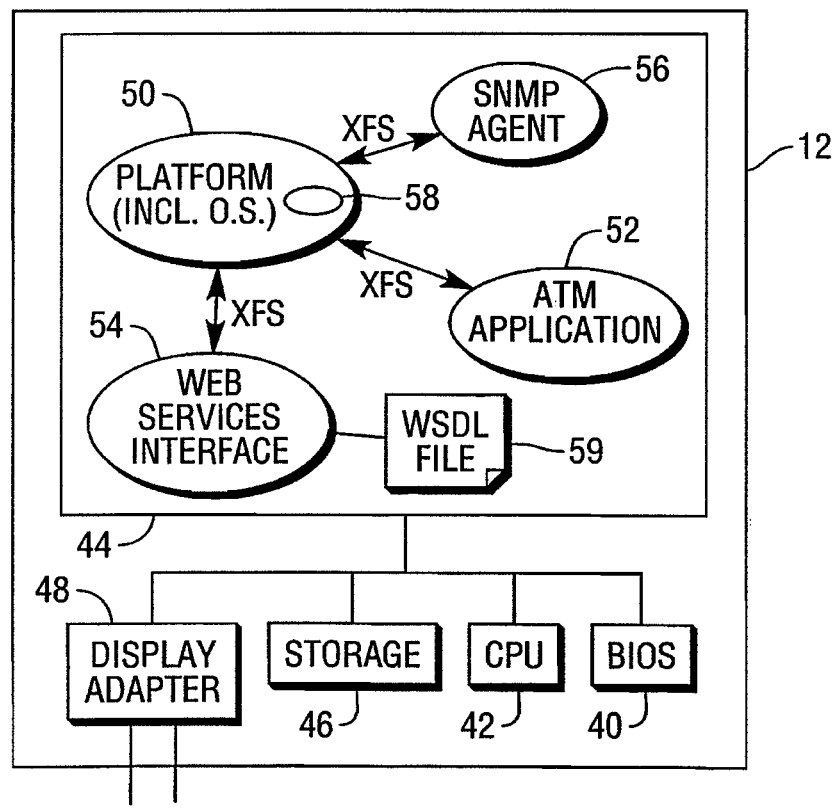
FIG. 2 is block diagram of a part (the terminal controller) of the self-service terminal of FIG. 1, where the terminal controller implements the Web services interface.

Reference will now also be made to FIG. 2, which is a simplified block diagram of the ATM controller module 12 of the ATM 10. The controller module 12 comprises a BIOS 40 stored in non-volatile memory, a microprocessor 42, associated main memory 44 used by the microprocessor 42, storage space 46 in the form of a magnetic disk drive, and a display controller 48 in the form of a graphics card. The graphics card 48 controls the customer display 14 and the display portion of the operator panel module 30.

In use, the main memory 44 is loaded with a platform 50 (including an ATM operating system kernel and drivers for the modules in the ATM 10), an ATM application 52, a Web services interface 54, and a management agent 56 (in the form of an SNMP (simple network management protocol) agent).

The platform 50 monitors the condition of each module within the ATM 10 (state of health monitoring), and stores status information relating to the modules, such as logs and tallies of module activity.

The ATM application 52 is responsible for controlling the operation of the ATM 10. In particular, the ATM application 52 provides the sequence of screens used in each customer transaction (referred to as the transaction flow), and obtains authorization for transactions from a remote transaction authorization system (not shown). The ATM application 52 also provides a sequence of screens on the operator panel module 30 for service personnel who are maintaining, replenishing, or otherwise operating on the ATM 10.

The management agent 56 monitors the status information relating to the modules in the ATM 10, and sends a message to a remote management centre (not shown) if the status of certain components within the modules change. This type of message is typically referred to as a 'trap' or an 'event', and is asynchronous. The SNMP agent 56 can also provide status information in response to a request from the remote management centre (not shown).

The ATM application 52, the Web services interface 54, and the SNMP agent 56 communicate with the platform 50 via a CEN/XFS interface. CEN is the European Committee for Standardization, and XFS is the eXtensions for Financial Services standard. XFS (eXtensions for Financial Services) is an industry-standard protocol for communicating financial information. The current version of this CEN/XFS standard is the CEN/XFS v.3.10 specification, which can be downloaded from ftp://ftp.cen.eu/PUBLIC/CWAs/other/WS-XFS/CWA15748/. This lists the format and structure of the commands, features, and device classes that comply with the XFS standard.

The platform 50 includes an XFS manager that receives XFS commands from the ATM application 52 and routes these commands to service providers (not shown) associated with the appropriate modules for operating on the received XFS command. The XFS manager and the service providers (together illustrated in FIG. 2 as ellipse 58) form a management component for retrieving management information from the modules in the ATM 10.

The Web services interface 54 accesses a WSDL (Web Services Description Language) file 59 that includes information about the type of requests that the Web services interface 54 can supply, and the format needed to submit those requests. In this embodiment, the WSDL file 59 includes commands corresponding to the complete set of CEN/XFS commands, although not necessarily in the same format as the CEN/XFS commands because the CEN/XFS commands assume that a C++ interface is used. By providing corresponding, but different, commands, the Web services interface 54 can receive commands that are not compliant with a C++ interface. The Web services interface 54 includes an interface to the platform 50 that complies with the CEN/XFS interface, so it can convert a received command to the corresponding CEN/XFS command. The Web services interface 54 therefore provides a new set of commands that it can convert to CEN/XFS commands and convey to the XFS Manager.

In this embodiment, the Web services interface 54 can be accessed via a dedicated Web page that can be loaded into a Web browser. The dedicated Web page includes predefined commands conforming to the format provided by the WSDL file 59.

As the platform 50 receives status information from the various modules within the ATM 10, the platform 50 may store this information.

In addition to storing status information, the platform 50 can also query the status of devices dynamically through their service provider interfaces to check their status prior to attempting to carry out a command. The platform 50 can also receive asynchronous events "unsolicited" from the service provider when something changes and is reported through an event. In response to such an asynchronous event, the Web services interface 54 would cause the platform 50 to query the service provider (not shown separately) to retrieve the information required to obtain the current device state information.

Figure 3:
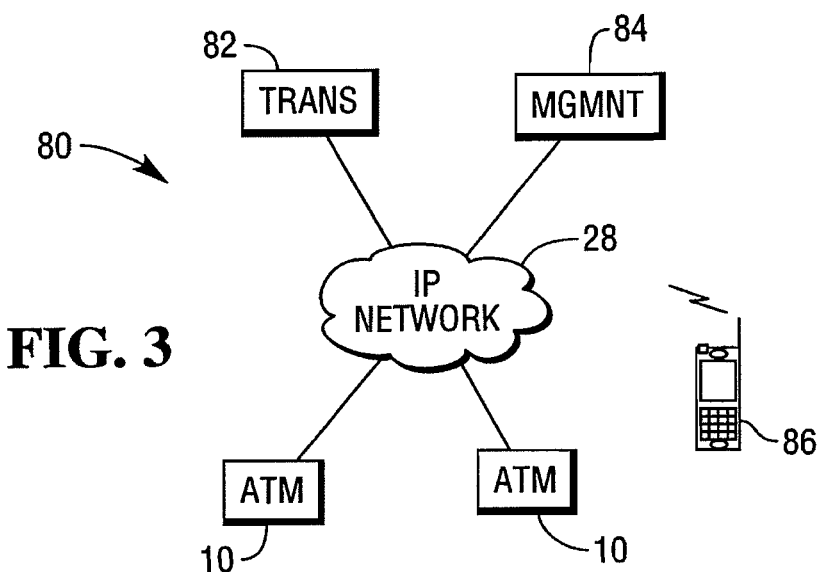
FIG. 3 is a block diagram illustrating a self-service terminal network including two self-service terminals of the type illustrated in FIG. 1, and a portable device carried by a service person.

Reference will now be made to FIG. 3, which is a block diagram illustrating an ATM network 80 including two ATMs 10 (which can be considered to be identical for the purpose of this description), a transaction authorization system 82 remote from the ATMs 10, a management system 84, which is also remote from the ATMs 10, and a portable device (in the form of a cellphone) 86 carried by a service person and used to access data from the ATMs 10.

Figure 4:
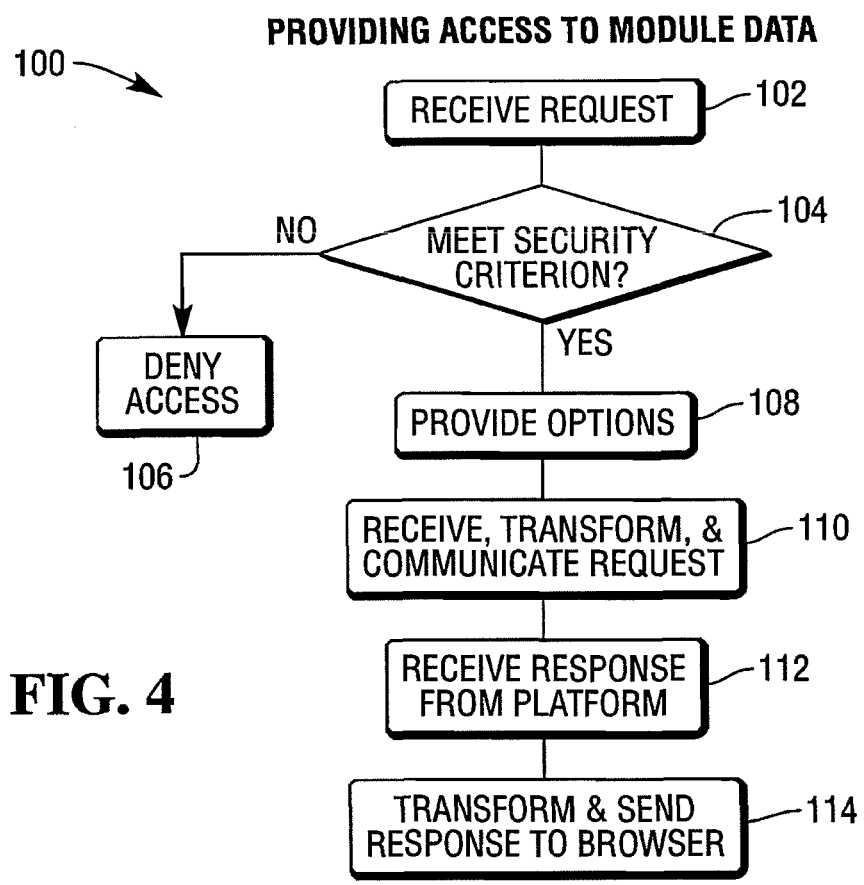
FIG. 4 is a flowchart illustrating steps involved in accessing management information via the Web services interface of FIGS. 1 and 2 using the portable device of FIG. 3.

The cellphone accesses the ATM modules via the Web services interface 54, as will now be described with reference to FIG. 4, which is a flowchart 100 illustrating steps implemented by the ATM 10 in providing access to data from the ATMs 10.

Initially, the remote management system 84 may receive a trap from the SNMP agent 56 indicating that there is a fault with, for example, the receipt printer module 20. The remote management system 84 then forwards a notification by SMS messaging to a service person carrying the cellphone 86 that the ATM 10 is experiencing problems with the receipt printer module 20. This SMS message is received by the cellphone 86 and displayed to the service person.

The service person then uses a Web browser executing on the cellphone 86 to access a URL (Uniform Resource Locator) associated with the Web services interface 54 and hosted by the ATM controller 12. The URL retrieves content that is customized for navigation by devices having small displays, such as cellphone 86.

The Web service interface 54 receives this request (step 102) and prompts the service person to enter a valid username and passcode combination (step 104) to fulfill a security criterion. If an invalid username and passcode combination is entered, then the Web service interface 54 denies access to the service person (step 106). If a valid username and passcode combination is entered, then the Web service interface 54 provides the cellphone's Web browser with a set of selectable options (step 108).

These selectable options include performing status requests on modules within the ATM 10. In this example, the service person requests the current status of the receipt printer module 20. The Web service interface 54 receives this request, transforms the request into CEN/XFS format, and communicates the transformed request to the platform 50 (step 110).

The platform 50 (specifically, the XFS manager in the platform 50) sends the request to the appropriate service provider (not shown separately) and receives a response, which it communicates to the Web service interface 54. The Web service interface 54 receives this response (step 112), which it transforms and sends to the Web browser (step 114) on the cellphone 86.

The service person can then review the status of the receipt printer module 20 and decide whether it is necessary to visit the ATM 10 or not. For example, the ATM 10 may have reset the receipt printer module 20, causing the fault to be rectified, in which case, the service person may not need to make a site visit to the ATM 10. If the service person decides to visit, then he/she may ascertain if a part of the receipt printer module 20 is likely to be faulty, and may bring a spare part for the receipt printer module 20, or a replacement receipt printer module 20.

Second Embodiment

Figure 5:
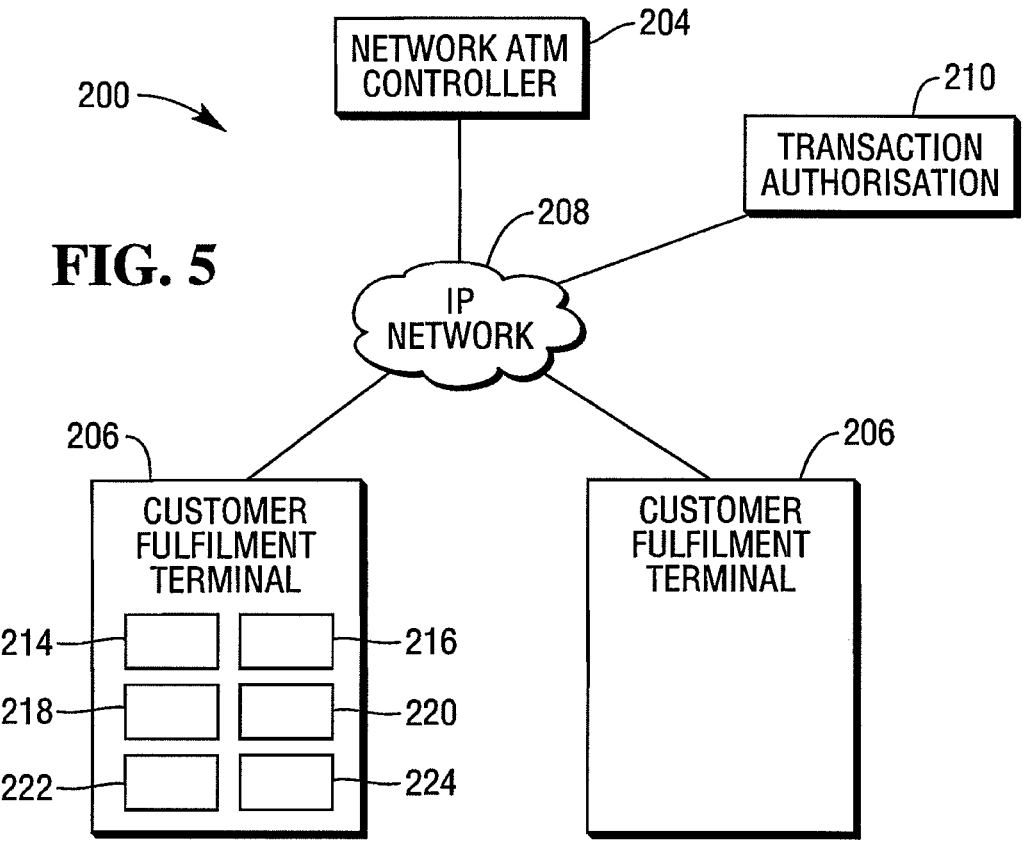
FIG. 5 is a block diagram of a distributed self-service terminal including Web services interfaces according to another embodiment of the present invention.

Another embodiment of the present invention will now be described with reference to FIG. 5, which is a block diagram of a distributed self-service terminal system 200. The distributed self-service terminal system 200 is in the form of a distributed ATM system 200.

The distributed ATM system 200 comprises a network ATM controller 204 coupled to a plurality of customer fulfillment terminals 206 by an IP network 208, and also coupled to a transaction authorization system 210.

Each customer fulfillment terminal 206 comprises a customer display 214, a card reader/writer module 216, an encrypting keypad module 218, a receipt printer module 220, a cash dispenser module 222, and a journal printer module 224 for creating a record of every transaction executed by the customer fulfillment terminal 206.

Each of these modules 214 to 224 includes a dedicated network connection, which enables each module to communicate directly with the network ATM controller 204, and a dedicated Web services interface. However, these components are only illustrated for one representative module, the cash dispense module 222, as shown in FIG. 6.

Figure 6:
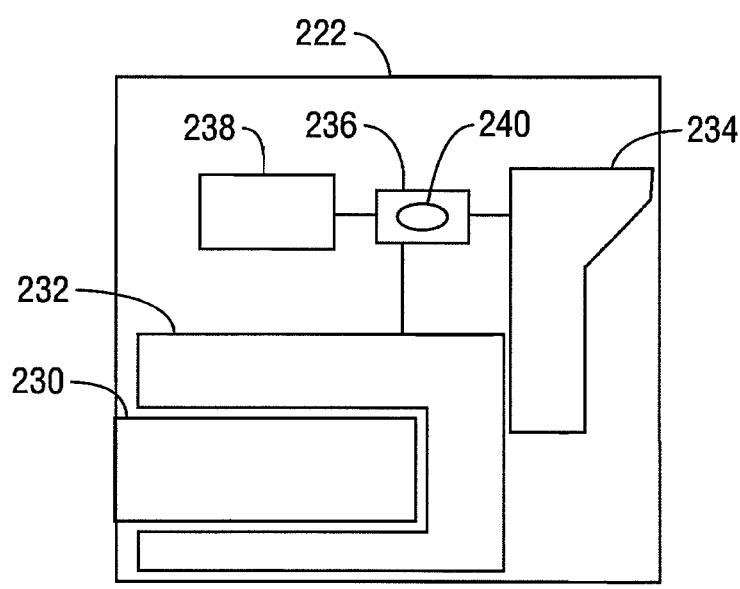
FIG. 6 is a block diagram illustrating a module (the cash dispense module) of the distributed self-service terminal of FIG. 5 in more detail.

Reference will now be made to FIG. 6, which is a block diagram illustrating the cash dispense module 222 in more detail.

The cash dispense module 222 comprises a pick unit 230 for picking banknotes from an inserted currency cassette 232 loaded with banknotes, a presenter unit 234 for presenting picked banknotes to a customer, a dispenser controller 236 for controlling the operation of the cash dispense module 222, and a network connection 238 having a unique IP address. The dispenser controller 236 includes a Web services interface 240, which communicates with the network ATM controller 204.

In use, when a customer inserts a card into the card reader/writer module 216 then the card reader/writer module 216 reads details from the inserted card and communicates these read details (in encrypted form) to the network ATM controller 204 via the network connection (not shown) within the card reader/writer module 216.

On receiving these details, the network ATM controller 204 instructs the encrypting keypad module 218 (via the Web services interface (not shown)) to receive a PIN from the customer, to encrypt the received PIN, and to communicate the encrypted PIN back to the network ATM controller 204 via the encrypting keypad's network connection (not shown).

The network ATM controller 204 also instructs the encrypting keypad module 218 (via the Web services interface (not shown)) to receive a transaction request from the customer (in this example, a cash dispense request), and to communicate this received transaction request back to the network ATM controller 204 via the encrypting keypad's network connection (not shown).

The network ATM controller 204 then obtains authorization for this transaction from the transaction authorization system 210. If approved, the network ATM controller 204 instructs the dispenser controller 236 in the cash dispense module 222 (via the network connection 238 and the Web services interface 240) to dispense the requested amount of cash. Once this has been completed, and the customer has removed the presented banknotes, then the dispenser controller 236 notifies the network ATM controller 204 that the customer has taken the cash.

On receiving this notification, the network ATM controller 204 instructs the card reader/writer module 216 (via its network connection and Web services interface (neither of which is shown)) to eject the customer's card for retrieval by the customer, thereby concluding the transaction.

Since each module includes its own network connection and Web services interface, a service person (and/or a management centre) may access management information stored on each module by sending a request to the Web service interface for that module. This may be implemented simultaneously with a customer transaction. This allows a service person to check the status of a module, or information relating to module usage, without having to visit the ATM. For example, a service person may query a module (where the module has a Web services interface), or the ATM (where the ATM has a Web services interface), to obtain the number of print operations performed by a printer since the print head was last changed, the number of pick operations performed by a pick unit within a dispense module since the pick unit was last serviced, the amount of receipt paper remaining in a printer, or the like.

It should now be appreciated that these embodiments have the advantage that an interface compatible with Web technologies can be used to provide access to to information usually retrieved using an interface requiring a specific programming language to be used, such as C or C++. This enables a new interface to be provided that is dislocated from the original SST or module interface.

By allowing a service person to retrieve information directly from the SST in real time, up-to-date information is available that is not diluted or truncated by subsequent data transformation.

By providing modules with common Web service interfaces, it is easier and less expensive to integrate these modules into SSTs.

By using Web services, client applications can be provided for execution by Web browsers, so that the same client can be used on different platforms, different operating systems, and the like.

By using Web services as a layer above the XFS Manager, conventional applications can still communicate directly with the XFS Manager to control the ATM, without requiring any changes to these conventional applications.

Various modifications may be made to the above described embodiments within the scope of the invention, for example, in other embodiments, instead of using a Web browser as the presentation client on a portable device, a customized client could be provided. The customized client could include additional security requirements, and may have a richer graphical interface.

In other embodiments, a management agent other than an SNMP agent may be used. For example, Windows Management Instrumentation (WMI) may be used, a proprietary management agent may be used, or the like.

In the above embodiments, the Web services interface supports CEN/XFS commands; whereas, in other embodiments, the Web services interface may support OPOS (a retail industry standard), CUSS (a travel industry standard), a proprietary application programming interface (API) such as the NCR (trade mark) Device Status Manager, or any other convenient protocol or standard.

In the above embodiments, the Web services interface supports financial industry terminals; whereas, in other embodiments, a single application may be provided that can access and obtain state of health information from terminals used in the financial, retail, gaming, healthcare, and travel industries. Since each terminal provides a Web services interface, each terminal can translate generic commands to the specific command format used in that industry.

In other embodiments, multi-level, role-based security with different levels of access may be provided using the Web services interface. For example, replenishers accessing consumable stock levels may have one level of access; whereas cash in transit (CIT) personnel accessing cash levels may have a different level of access; and engineers accessing device status values and executing commands such as remote reboot may have a third level of access.

In other embodiments a different security criterion may be implemented to that described above. For example, X509 certificates, biometric recognition or validation, or the like. These could be used to authenticate a service person (such as an engineer) to the Web service interface 54.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. An automated teller machine (ATM) for enabling an ATM service operator remote from the ATM to perform an ATM management function on the ATM while an ATM customer at the ATM is conducting an ATM customer transaction unrelated to the ATM management function being performed on the ATM by the remote ATM service operator, the ATM comprising:
   an ATM customer transaction module operable to (i) implement a function associated with the ATM customer transaction, (ii) provide status information relating to the ATM customer transaction module, and (iii) interact with a cash dispense module of the ATM; and
   an ATM controller coupled to the ATM customer transaction module and including (i) a management component for retrieving status information from the ATM customer transaction module and for querying devices associated with the ATM through those devices' interfaces to retrieve device status, and (ii) a Web services interface for enabling the remote ATM service operator at a remote device having a Web browser to access the retrieved status information and device status while the ATM customer at the ATM is conducting the ATM customer transaction unrelated to the ATM management function being performed on the ATM by the remote ATM service operator.

2. An ATM according to claim 1, wherein the ATM customer transaction modules comprises one of a card reader module, and a check deposit module.

3. An ATM according to claim 2, further comprising an ATM service function module different from the ATM customer transaction module and operable to implement an ATM management function, wherein the ATM service function module comprises one of a journal printer module and a service operator panel module.

4. An automated teller machine (ATM) comprising:
   a cash dispense module operable to implement a cash dispense function in response to a cash dispense request from an ATM customer, and including (i) a processor executing (a) a management component operable to obtain status information relating to the cash dispense module, and (b) a first Web services interface for providing access to the obtained status information to a remote device, and (ii) a network connection for communicating directly with a remote transaction controller; and
   a check deposit module operable to implement a check deposit function in response to a check deposit request from an ATM customer, and including (i) a processor executing (a) a management component operable to obtain status information relating to the check deposit module, and (b) a second Web services interface for providing access to the obtained status information to a remote device, and (ii) a network connection for communicating directly with a remote transaction controller;
   wherein (i) the first and second Web services interfaces are separate and different from each other, (ii) the first Web services interface is dedicated to the cash dispense module operable to implement a cash dispense function, and (iii) the second Web services interface is dedicated to the check deposit module operable to implement a check deposit function, and wherein a remote network connection issued by a server operator accesses at least one of the check deposit module and the cash dispense module for information simultaneous to a particular ATM customer performing a particular ATM operation and to query the cash dispense module and check deposit module using each module's interface to check on module statuses while the ATM customer is performing the particular ATM operation.

5. An ATM according to claim 4, wherein the network connections comprise dedicated network cards for each module.

6. An ATM according to claim 4, wherein the network connections comprise dedicated communication stacks, each communication stack being associated with a serial port to provide a transport layer; and a single network card used by all serial ports.

7. A distributed automated teller machine (ATM) system comprising ATM customer transaction modules at a first location and an ATM transaction controller at a second location remote from the first location, the ATM customer transaction modules including:
- a cash dispense module operable to implement a cash dispense function in response to a cash dispense request from an ATM customer, and including (i) a processor executing (a) a management component operable to obtain status information relating to the cash dispense module, and (b) a first Web services interface dedicated to the cash dispense module and for enabling an ATM service operator with a remote device having a Web browser to request and directly access the obtained status information from the first Web services interface without having to go through a remote management system, and (ii) a network connection for communicating directly with the remote ATM transaction controller; and
- a check deposit module operable to implement a check deposit function in response to a check deposit request from an ATM customer, and including (i) a processor executing (a) a management component operable to obtain status information relating to the check deposit module, and (b) a second Web services interface dedicated to the check deposit module and for enabling an ATM service operator with a remote device having a Web browser to request and directly access the obtained status information from the second Web services interface without having to go through a remote management system, and (ii) a network connection for communicating directly with the remote ATM transaction controller, and wherein a remote network connection issued by the ATM server operator accesses at least one of the check deposit module and the cash dispense module for information simultaneous to a particular ATM customer performing a particular ATM operation and to query the cash dispense module and check deposit module using each module's interface to check on module statuses while the ATM customer is performing the particular ATM operation.

8. A distributed ATM system according to claim 7, wherein (i) the remote ATM transaction controller controls a plurality of cash dispense modules, (ii) each cash dispense module of the plurality of cash dispense modules is located in a different geographical location, and (iii) each cash dispense module of the plurality of cash dispense modules having its own associated Web services interface which can receive a request from a remote device of an ATM service operator for status information to at the same time the respective cash dispense module is implementing a cash dispense function for an ATM customer who is other than an ATM service operator during an ATM customer cash dispense transaction involving the respective cash dispense module.

9. A distributed ATM system according to claim 7, wherein (i) the remote ATM transaction controller controls a plurality of check deposit modules, (ii) each check deposit module of the plurality of check deposit modules is located in a different geographical location, and (iii) each check deposit module of the plurality of check deposit modules having its own associated Web services interface which can receive a request from a remote device of an ATM service operator for status information at the same time the respective check deposit module is implementing a check deposit function for an ATM customer who is other than an ATM service operator during an ATM customer check deposit transaction involving the respective check deposit module.

10. A method of operating an automated teller machine (ATM) to assist a remote ATM service operator in performing an ATM management function on the ATM while an ATM customer at the ATM is conducting an ATM customer transaction unrelated to the ATM management function being performed on the ATM by the remote ATM service operator, the ATM having (i) an ATM application, (ii) a number of ATM modules, and (iii) an eXtensions for Financial Services (XFS) manager that receives XFS commands from the ATM application and routes the XFS commands to appropriate ATM modules for operating on the received XFS command, the method comprising:
- receiving from the remote device of the ATM service operator a request for ATM management information in a format compatible with a Web services interface which operates as a software layer above the XFS manager;
- ascertaining if the received request fulfils a security criterion;
- transforming the received request into a different format in the event that the request does fulfill the security criterion;
- communicating the transformed request to a device manager in a format recognized by a device of the ATM using that device's interface;
- receiving a response from the device manager;
- transforming the response into a format compatible with the Web services interface; and
- relaying the transformed response to the remote device of the ATM service operator and thereby to assist the ATM service operator in performing the ATM management function on the ATM while the ATM customer at the ATM is conducting the ATM customer transaction unrelated to the ATM management function being performed on the ATM by the remote ATM service operator, the ATM transaction performing one of: cash dispensing and check depositing.

* * * * *